A. S. BROWN.
Horse Hay-Fork.
No. 90,233. Patented May 18, 1869.
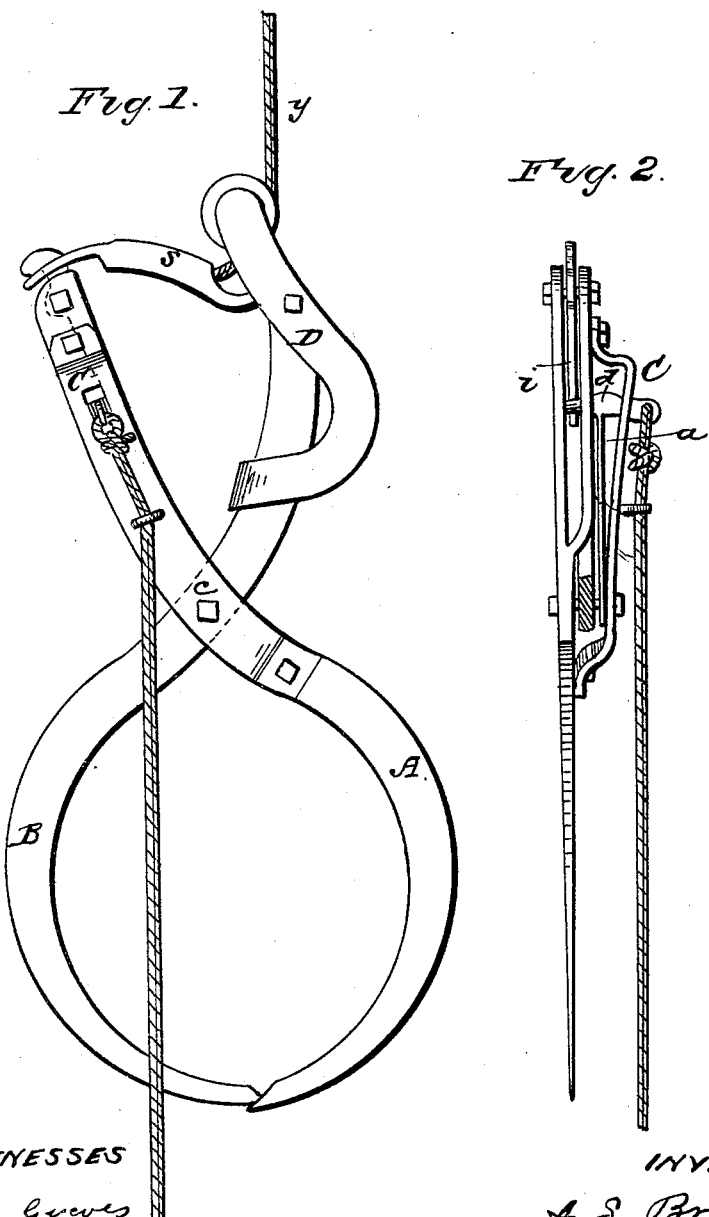

United States Patent Office.

ADAM S. BROWN, OF LEBANON, PENNSYLVANIA.

Letters Patent No. 90,233, dated May 18, 1869.

IMPROVEMENT IN HORSE HAY-FORKS.

The Schedule referred to in these Letters Patent and making part of the same.

*To all whom it may concern:*

Be it known that I, ADAM S. BROWN, of Lebanon, in the county of Lebanon, and State of Pennsylvania, have invented a new and valuable Improvement in Hay-Forks; and I do hereby declare that the following is a full, clear, and exact description of the construction and operation of the same, reference being had to the annnexed drawings, making a part of this specification, and to the letters and figures of reference marked thereon.

Figure 1, of the drawings, is a plan view of my device.

Figure 2 is a sectional view of a portion of the same.

My invention is connected with forks for lifting hay in large quantities; and

It consists, mainly, in combining and arranging, in a novel and efficient manner, devices by which the load upon the fork may be held with great firmness.

The letters A and B, respectively, represent the tines or sections of my fork, pivoted together in the usual manner at $c$.

The letter C is a strap, bolted to the tine A, as shown, and the said tine is also split, as represented on fig. 2.

The letter $a$ is a spring, secured at its lower end to the bolt that unites the tines A and B, and at its upper end to the dog $d$.

This dog $d$ passes through an opening in the strap C, and a similar opening in the split-off side of tine A, as shown, and its outer end is connected with the cord $h$.

The letter $i$ is a catch or dog, pivoted, as shown, to the bolt that unites the two parts of tine A, with its lower end extending downward beyond the point where the dog $d$ passes though its opening in the front side of said tine. When the hay is being lifted, the lower end of this catch rests against the dog $d$, as shown on fig. 2.

The extreme upper end of this catch is constructed in the form of a hook, which, when the weight is being lifted, receives and holds the slot in the tripping-rod $s$, in the manner shown on fig. 1.

The letter $s$ is a tripping-rod, or catch, constructed with a slot at one end, adapted to work with the hook on catch $i$, while its opposite end is widened out to form a brace, or rest against the slotted arm D, hereinafter mentioned.

The letter D is a slotted arm, pivoted to the tine B, as shown at $u$, and having a pulley, $v$, adjusted at its upper end, as represented.

A rope or cord, $y$, is attached to the trip $s$, and passes under this pulley, inside the slots of the arm.

To raise the weight, the trip $s$ is adjusted to the hook of catch $i$, as shown on fig. 1, and the rope $y$ is drawn upward.

When the fork is to be unloaded, the operator pulls the cord attached to the dog $d$. This movement withdraws said dog from the lower end of catch $i$, and releases the same, thereby allowing the trip $s$ to become disconnected from the hook on said catch. The tines now separate, and the load is discharged.

What I claim as my invention, and desire to secure by Letters Patent, is—

A hay-fork, having tines A and B, strap C, dog $d$, spring $a$, catch $i$, trip $s$, slotted arm D, and pulley $v$, constructed, arranged, and operating substantially as specified.

In testimony that I claim the above, I have hereunto subscribed my name, in the presence of two witnesses.

ADAM S. BROWN.

Witnesses:
  JOHN G. SNAVELY,
  RALPH BOYER.